US012590236B2

(12) United States Patent
Kobayashi et al.

(10) Patent No.: US 12,590,236 B2
(45) Date of Patent: Mar. 31, 2026

(54) THERMALLY CONDUCTIVE SILICONE HEAT DISSIPATION MATERIAL

(71) Applicant: Fuji Polymer Industries Co., Ltd., Nagoya (JP)

(72) Inventors: Shingo Kobayashi, Aichi (JP); Yuko Kimura, Aichi (JP)

(73) Assignee: Fuji Polymer Industries Co., Ltd., Aichi (JP)

(*) Notice: Subject to any disclaimer, the term of this patent is extended or adjusted under 35 U.S.C. 154(b) by 730 days.

(21) Appl. No.: 17/799,526

(22) PCT Filed: Jul. 15, 2021

(86) PCT No.: PCT/JP2021/026567

§ 371 (c)(1),
(2) Date: Aug. 12, 2022

(87) PCT Pub. No.: WO2022/049902

PCT Pub. Date: Mar. 10, 2022

(65) Prior Publication Data

US 2023/0097362 A1 Mar. 30, 2023

(30) Foreign Application Priority Data

Sep. 3, 2020 (JP) ................................ 2020-148459

(51) Int. Cl.

| | |
|---|---|
| ***C09K 5/14*** | (2006.01) |
| ***C08K 3/013*** | (2018.01) |
| ***C08K 3/014*** | (2018.01) |
| ***C08L 83/04*** | (2006.01) |

(52) U.S. Cl.

CPC ................ *C09K 5/14* (2013.01); *C08K 3/013* (2018.01); *C08K 3/014* (2018.01); *C08L 83/04* (2013.01)

(58) Field of Classification Search

None

See application file for complete search history.

(56) References Cited

U.S. PATENT DOCUMENTS 5,103,092 A 4/1992 Takahashi et al.
6,306,957 B1 * 10/2001 Nakano et al. ......... C08L 83/04 524/700
2002/0018885 A1 2/2002 Takahashi et al.
2015/0008361 A1 1/2015 Hattori
2019/0367792 A1 12/2019 Iwata
2020/0010621 A1 1/2020 Suzumura
2020/0176350 A1 6/2020 Kikuchi et al.
2020/0239758 A1 7/2020 Ota
2020/0270500 A1 8/2020 Ota
2022/0380653 A1 12/2022 Kataishi et al.
2023/0227707 A1 7/2023 Yukutake et al.

FOREIGN PATENT DOCUMENTS

EP 4 039 750 8/2022
EP 4 184 564 5/2023
JP 2000-063873 2/2000
JP 3092127 B 9/2000
JP 2006-089675 4/2006
JP 2011-218723 11/2011
JP 2019-210305 12/2019
TW 201922939 6/2019
WO WO-2016199535 A1 * 12/2016 ............ B29C 45/00
WO 2019/021825 1/2019
WO 2019/216190 11/2019

OTHER PUBLICATIONS

Extended European Search Report issued in corresponding European Patent Application No. 21863960.7, Oct. 10, 2023, 7 pages.
International Search Report issued in International Application No. PCT/JP2021/026567, Oct. 12, 2021, 5 pages w/ translation.

* cited by examiner

*Primary Examiner* — Tanisha Diggs
(74) *Attorney, Agent, or Firm* — HSML P.C.

(57) ABSTRACT

A thermally conductive silicone heat dissipating material contains a silicone polymer, a thermally conductive inorganic filler, and a heat resistance improver. The thermally conductive inorganic filler has a BET specific surface area ($A_{BET}$) of 0.3 $m^2/g$ or more and is surface treated with a surface treatment agent expressed by $Si(OR')_4$ or $R_xSi(OR')_{4-x}$ (where R represents a hydrocarbon group having 1 to 4 carbon atoms or an aromatic hydrocarbon group having 6 to 12 carbon atoms, R' represents a hydrocarbon group having 1 to 4 carbon atoms, and x represents an integer of 1 to 2). The content of the thermally conductive inorganic filler is 100 to 10000 parts by mass with respect to 100 parts by mass of the silicone polymer. The thermally conductive inorganic filler having a large specific surface area and a small average particle size is surface treated with a silane coupling agent with a low molecular weight, so that the heat resistance of the thermally conductive silicone heat dissipating material is improved.

7 Claims, 1 Drawing Sheet

THERMALLY CONDUCTIVE SILICONE HEAT DISSIPATION MATERIAL

TECHNICAL FIELD

The present invention relates to a thermally conductive silicone heat dissipating material that is suitable to be interposed between a heat generating member and a heat dissipating member of electrical and electronic components or the like.

BACKGROUND ART

With the significant improvement in performance of semiconductor devices such as CPUs in recent years, the amount of heat generated by them has become extremely large. For this reason, heat dissipating members are attached to electronic components such as semiconductor devices that may generate heat, and a thermally conductive silicone grease or sheet is used to improve the adhesion between the heat dissipating members and the semiconductor devices. Patent Documents 1 to 3 propose the surface treatment of a thermally conductive inorganic filler with a silane coupling agent having a long chain alkyl group.

PRIOR ART DOCUMENTS

Patent Documents

Patent Document 1: JP 2000-063873 A
Patent Document 2: JPWO 2019-021825 A1
Patent Document 3: JP 2019-210305 A

DISCLOSURE OF INVENTION

Problem to be Solved by the Invention

However, the conventional silane coupling agent with a long chain alkyl group has low heat resistance and may reduce the physical properties when held at high temperatures.

To solve the above conventional problems, the present invention provides a thermally conductive silicone heat dissipating material whose heat resistance is improved by surface treating a thermally conductive inorganic filler having a large specific surface area and a small average particle size with a silane coupling agent with a low molecular weight.

Means for Solving Problem

A thermally conductive silicone heat dissipating material of the present invention contains a silicone polymer as a matrix resin, a thermally conductive inorganic filler, and a heat resistance improver. The thermally conductive inorganic filler has a BET specific surface area ($A_{BET}$) of 0.3 $m^2/g$ or more and is surface treated with a surface treatment agent expressed by $Si(OR')_4$ or $R_xSi(OR')_{4-x}$ (where R represents a hydrocarbon group having 1 to 4 carbon atoms or an aromatic hydrocarbon group having 6 to 12 carbon atoms, R' represents a hydrocarbon group having 1 to 4 carbon atoms, and x represents an integer of 1 to 2). A content of the thermally conductive inorganic filler is 100 to 10000 parts by mass with respect to 100 parts by mass of the silicone polymer as the matrix resin.

Effects of the Invention

The thermally conductive silicone heat dissipating material of the present invention contains a silicone polymer as a matrix resin, a thermally conductive inorganic filler, and a heat resistance improver. The thermally conductive inorganic filler has a BET specific surface area ($A_{BET}$) of 0.3 $m^2/g$ or more and is surface treated with a surface treatment agent expressed by $Si(OR')_4$ or $R_xSi(OR')_{4-x}$ (where R represents a hydrocarbon group having 1 to 4 carbon atoms or an aromatic hydrocarbon group having 6 to 12 carbon atoms, R' represents a hydrocarbon group having 1 to 4 carbon atoms, and x represents an integer of 1 to 2). The content of the thermally conductive inorganic filler is 100 to 10000 parts by mass with respect to 100 parts by mass of the silicone polymer as the matrix resin. This configuration can improve the heat resistance of the thermally conductive silicone heat dissipating material.

DESCRIPTION OF THE INVENTION

Figure 1A:
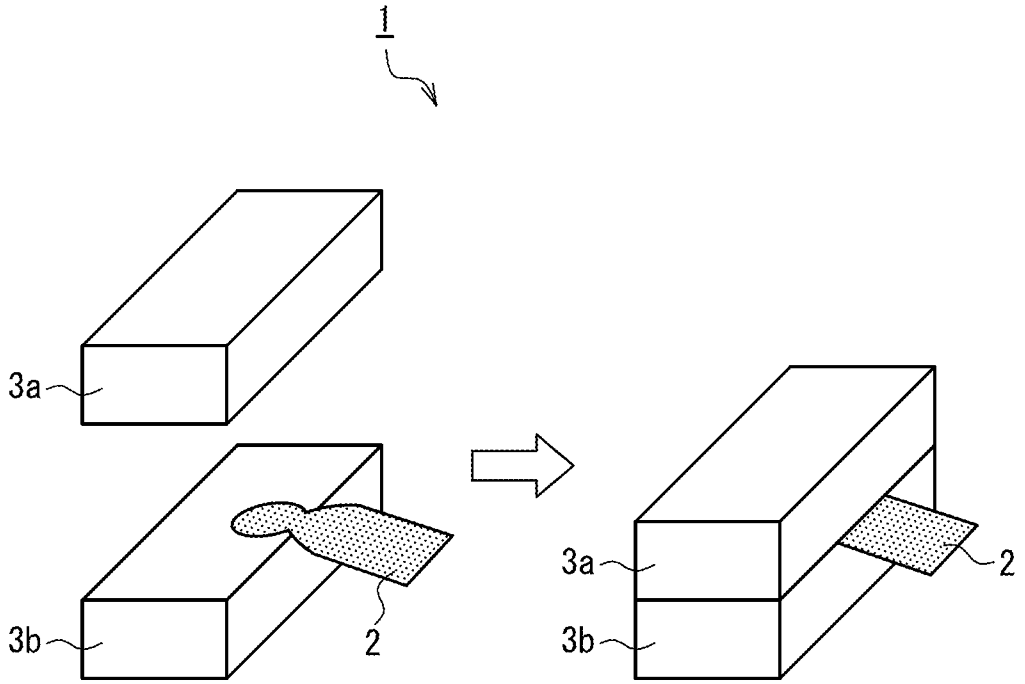
FIGS. 1A to 1B are diagrams illustrating a method for measuring a thermal conductivity of a sample in an example of the present invention.

When the thermally conductive inorganic filler (also referred to as an inorganic filler or inorganic particles) with a BET specific surface area of 0.3 $m^2/g$ or more is mixed with the silicone polymer without having been subjected to a surface treatment, curing inhibition occurs and a good cured product cannot be obtained. This may be attributed to the fact that hydroxyl groups on the surface of the filler react with crosslinking components SiH of the addition silicone, and the number of components that inherently act as crosslinking points of the silicone polymer is reduced. To avoid this phenomenon, the thermally conductive inorganic filler with a large BET specific surface area needs to be surface treated with a silane coupling agent in advance. The present inventors found that the heat resistance of the thermally conductive silicone heat dissipating material was improved by surface treating the thermally conductive inorganic filler having a large BET specific surface area and a small average particle size with the silane coupling agent with a low molecular weight. For example, when the thermally conductive inorganic filler with a BET specific surface area ($A_{BET}$) of 0.3 $m^2/g$ is in the form of spherical particles, the average particle size is 10 μm.

The thermally conductive silicone heat dissipating material of the present invention contains the silicone polymer as the matrix resin and the thermally conductive inorganic filler. The BET specific surface area ($A_{BET}$) of the thermally conductive inorganic filler is preferably 0.3 $m^2/g$ or more, more preferably 0.3 to 100 $m^2/g$, even more preferably 0.5 to 80 $m^2/g$, and further preferably 1.0 to 50 $m^2/g$. Thus, various inorganic fillers can be used according to the intended purpose, and the thermal conductive properties can also be improved.

The thermally conductive inorganic filler is preferably composed of aluminum oxide, zinc oxide, aluminum nitride, boron nitride, magnesium oxide, aluminum hydroxide, or silica (except for hydrophilic fumed silica) These materials may be used alone or in combinations of two or more. Alternatively, a plurality of types of particles with different BET specific surface areas (particle sizes) and shapes may be mixed together.

The thermally conductive inorganic filler is surface treated with the surface treatment agent expressed by $Si(OR')_4$ or $R_xSi(OR')_{4-x}$ (where R represents a hydrocarbon group having 1 to 4 carbon atoms or an aromatic hydrocarbon group having 6 to 12 carbon atoms, R' represents a hydrocarbon group having 1 to 4 carbon atoms, and x represents an integer of 1 to 2). This surface treatment agent does not contain a long chain alkyl group and therefore has heat resistance, which can also prevent curing inhibition. The surface treatment agent is also referred to as a silane coupling agent.

Examples of the silane coupling agent include methyltrimethoxysilane, ethyltrimethoxysilane, propyltrimethoxysilane (including n- and iso-), butyltrimethoxysilane (including n- and iso-), and phenyltrimethoxysilane. These silane coupling agents may be used alone or in combinations of two or more. In this case, the surface treatment may include adsorption in addition to a covalent bond. This allows the surface treatment agent to be highly reactive with the surface of the inorganic filler.

In the surface treatment, only the inorganic filler may be pretreated with the surface treatment agent such as a silane coupling agent before being mixed with the matrix resin (ie., a pretreatment method), or the surface treatment agent may be added when the inorganic filler is mixed with the matrix resin (ie., an integral blend method). The pretreatment method includes a dry treatment and a wet treatment. In the dry treatment, the surface treatment agent in undiluted form or a solvent-diluted solution of the surface treatment agent is added and mixed with the inorganic filler. In the wet treatment, the surface treatment agent, a solvent, and the inorganic filler are mixed to form a slurry, and the solvent is volatilized and removed while stirring the slurry. In this case, the dry treatment is preferred in terms of the operation. The dry treatment may also indude, e.g., heating and decompression (vapor phase treatment) as needed. This can strengthen a covalent bond or adsorption. The surface treatment agent is applied preferably in an amount of 0.01 to 5 parts by mass, and more preferably in an amount of 0.05 to 3 parts by mass with respect to 100 parts by mass of the inorganic filler.

The content of the thermally conductive inorganic filler is 100 to 10000 parts by mass, preferably 200 to 5000 parts by mass, and further preferably 250 to 3000 parts by mass with respect to 100 parts by mass of the silicone polymer as the matrix resin. Thus, the thermally conductive silicone heat dissipating material of the present invention has a good thermal conductivity. The thermal conductivity is preferably 1 to 5 W/m·K, more preferably 1.2 to 4.5 W/m·K, and further preferably 1.5 to 4 W/m·K The Asker C hardness of the thermally conductive silicone heat dissipating material after aging at 220° C. for 100 hours in the air is preferably minus 15 to 0 compared to the initial hardness, and the Asker C hardness of the thermally conductive silicone heat dissipating material after the aging has further continued at 220° C. for 500 hours in the air is preferably minus 20 to plus 20 compared to the initial hardness. The silicone heat dissipating material with these properties forms a silicone heat dissipating sheet that is temporarily softened by high-temperature aging for a short period of time (100 hours) and then is cured again by high-temperature aging for a middle period of time (500 hours). Specifically, the silicone heat dissipating sheet has the feature of being temporarily softened or maintaining the initial hardness after aging at 220° C. for 100 hours in the air and then being cured again after aging at the same temperature for 500 hours in the air. The silicone heat dissipating sheet undergoing this phenomenon is found to be resistant to thermal degradation due to longterm high-temperature aging.

The heat resistance improver is preferably at least one selected from the following (a) to (e):

(a) at least one organic metal complex selected from tetraiodophthalic acid metal salt, acetylacetone metal salt, 2-ethylhexanoic acid metal salt, cerium octylate metal salt, and phthalocyanine metal;
(b) at least one rare-earth metal selected from cerium, lanthanum, praseodymium, neodymium, samarium, europium, gadolinium, terbium, dysprosium, holmium, erbium, thulium, ytterbium, and lutetium or compounds thereof;
(c) at least one metal selected from copper, zinc, aluminum, iron, zirconium, and titanium or oxides and hydroxide of these metals;
(d) carbon powder or carbon nanopowder of at least one selected from acetylene black, carbon nanotube, carbon nanofiber, graphene, and furnace black; and
(e) a benzimidazolone compound.

Among these compounds, α-iron (III) oxide, copper phthalocyanine, cerium octylate, the benzimidazolone compound, or fumed titanium oxide is preferred. The heat resistance improver may be of one type or two or more types. The content of the heat resistance improver is preferably 0.01 to 10 parts by mass, and more preferably 0.05 to 5 parts by mass with respect to 100 parts by mass of the matrix resin.

The thermally conductive silicone heat dissipating material may further contain a thermally conductive inorganic filler with a BET specific surface area ($A_{BET}$) of less than 0.3 $m^2/g$ (also referred to as large particles). The lower limit of the BET specific surface area ($A_{BET}$) is preferably 0.01 $m^2/g$ or more. There may be a low probability that hydroxyl groups on the surface of the large particles will react with crosslinking components SiH of the addition silicone. Therefore, curing inhibition is less likely to occur, and a cured product can be obtained even without a surface treatment. The use of the large particles can avoid a reduction in the heat resistance of the thermally conductive silicone heat dissipating material, which may be caused by the silane coupling agent during high-temperature aging. Consequently, the large particles serve to improve the heat resistance. When the large particles are added, the amount of the large particles is preferably 10% by mass or more and less than 90% by mass, more preferably 30% to 90% by mass, and further preferably 50% to 90% by mass with respect to 100% by mass of the total amount of all the thermally conductive inorganic fillers.

The thermally conductive silicone heat dissipating material is preferably in the form of at least one selected from grease, putty, gel, and rubber. The gel or rubber silicone heat dissipating material may be molded into a sheet. These materials are suitable as a TIM (thermal interface material) to be interposed between a heat generating member such as a semiconductor device and a heat dissipating member.

The method for producing the thermally conductive silicone composition of the present invention includes mixing the silicone polymer as the matrix resin and the thermally conductive inorganic filler that has been subjected to the surface treatment, and optionally curing the mixture. The liquid materials such as grease and putty may be uncured. When a curing process is performed, a curing catalyst may be added. If the thermally conductive silicone composition is molded into, e.g., a sheet, a molding process is inserted between the mixing process and the curing process. The thermally conductive silicone composition in the form of a sheet is suitable for mounting on electronic components or the like. The thickness of the thermally conductive sheet is preferably 0.2 to 10 mm.

A compound with the following composition is preferably used to obtain a cured product.

A. Matrix Resin Component (Base Polymer)

The matrix resin component contains the following components A1 and A2. In this case, the components A1 and A2 add up to 100 parts by mass.

A1: a linear organopolysiloxane having at least two silicon-bonded alkenyl groups per molecule.

A2: an organohydrogenpolysiloxane having at least two silicon-bonded hydrogen atoms per molecule, which serves as a crosslinking component. The number of moles of the organohydrogenpolysiloxane is 0.5 to 1.5 moles with respect to 1 mole of the silicon-bonded alkenyl groups contained in the component A1.

The matrix resin component may contain an organopolysiloxane having no reactive group other than the components A1 and A2.

B. Thermally Conductive Inorganic Filler

The amount of the thermally conductive inorganic filler that has been surface treated is 100 to 10000 parts by mass with respect to 100 parts by mass of the matrix resin component.

C. Curing Catalyst

When the curing catalyst is (1) an addition reaction catalyst that is a platinum-based metal catalyst, the amount of the addition reaction catalyst is 0.01 to 1000 ppm by mass with respect to the matrix resin component.

D. Heat Resistance Improver

The amount of the heat resistance improver is 0.01 to 10 parts by mass with respect to 100 parts by mass of the matrix resin component.

The following component E may be added as needed.

E. Other Additives

Any amount of other additives such as a curing retarder and a coloring agent may be added.

Hereinafter, each component will be described.

(1) Base Polymer Component (Component A1)

The base polymer component is an organopolysiloxane containing two or more alkenyl groups bonded to silicon atoms per molecule. The organopolysiloxane containing two or more alkenyl groups is the base resin (base polymer component) of a silicone rubber composition of the present invention. In this case, the organopolysiloxane has two silicon-bonded alkenyl groups per molecule. The alkenyl group has 2 to 8 carbon atoms, and particularly 2 to 6 carbon atoms and can be, e.g., a vinyl group or an allyl group. The viscosity of the organopolysiloxane is preferably 10 to 1000000 mPa·s, and more preferably 100 to 100000 mPa·s at 25° C. in terms of workability and curability.

Specifically, an organopolysiloxane represented by the following general formula (Chemical Formula 1) is used. This organopolysiloxane contains two or more alkenyl groups per molecule, in which the alkenyl groups are bonded to silicon atoms at both ends of the molecular chain. The organopolysiloxane is a linear organopolysiloxane whose side chains are capped with alkyl groups. The viscosity of the organopolysiloxane is preferably 10 to 1000000 mPa·s at 25° C. in terms of workability and curability. Moreover, the linear organopolysiloxane may indude a small amount of branched structure (trifunctional siloxane units) in the molecular chain.

[Chemical Formula 1]

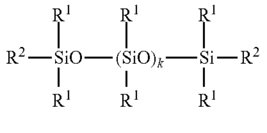

In the formula, $R^1$ represents substituted or unsubstituted monovalent hydrocarbon groups that are the same as or different from each other and have no aliphatic unsaturated bond, $R^2$ represents alkenyl groups, and k represents 0 or a positive integer. The monovalent hydrocarbon groups represented by $R^1$ have, e.g., 1 to 10 carbon atoms, and more preferably 1 to 6 carbon atoms. Specific examples of the monovalent hydrocarbon groups indude the following: alkyl groups such as methyl, ethyl, propyl, isopropyl, butyl, isobutyl, tert-butyl, pentyl, neopentyl, hexyl, cydohexyl, octyl, nonyl, and decyl groups; aryl groups such as phenyl, tolyl, xylyl, and naphthyl groups; aralkyl groups such as benzyl, phenylethyl, and phenylpropyl groups; and substituted forms of these groups in which some or all hydrogen atoms are substituted by halogen atoms (fluorine, bromine, chlorine, etc.) or cyano groups, including halogen-substituted alkyl groups such as chloromethyl, chloropropyl, bromoethyl, and trifluoropropyl groups and cyanoethyl groups. The alkenyl groups represented by $R^2$ preferably have 2 to 6 carbon atoms, and more preferably 2 to 3 carbon atoms. Specific examples of the alkenyl groups indude vinyl, allyl, propenyl, isopropenyl, butenyl, isobutenyl, hexenyl, and cyclohexenyl groups. In particular, the vinyl group is preferred. In the general formula (1), k is typically 0 or a positive integer satisfying $0 \leq k \leq 10000$, preferably $5 \leq k \leq 2000$, and more preferably $10 \leq k \leq 1200$.

The component A1 may also indude an organopolysiloxane having three or more, typically 3 to 30, and preferably about 3 to 20, silicon-bonded alkenyl groups per molecule. The alkenyl group has 2 to 8 carbon atoms, and particularly 2 to 6 carbon atoms and can be, e.g., a vinyl group or an allyl group. The molecular structure may be a linear, ring, branched, or three-dimensional network structure. The organopolysiloxane is preferably a linear organopolysiloxane in which the main chain is composed of repeating diorganosiloxane units, and both ends of the molecular chain are capped with triorganosiloxy groups. The viscosity of the linear organopolysiloxane may be 10 to 1000000 mPa·s, and particularly 100 to 100000 mPa·s at 25° C.

Each of the alkenyl groups may be bonded to any part of the molecule. For example, the alkenyl group may be bonded to either a silicon atom that is at the end of the molecular chain or a silicon atom that is not at the end (but in the middle) of the molecular chain. In particular, a linear organopolysiloxane represented by the following general formula (Chemical Formula 2) is preferred. The linear organopolysiloxane has 1 to 3 alkenyl groups on each of the silicon atoms at both ends of the molecular chain. In this case, however, if the total number of the alkenyl groups bonded to the silicon atoms at both ends of the molecular chain is less than 3, at least one alkenyl group is bonded to the silicon atom that is not at the end (but in the middle) of the molecular chain (e.g., as a substituent in the diorganosiloxane unit). As described above, the viscosity of the linear organopolysiloxane is preferably 10 to 1000000 mPa·s at 25° C. in terms of workability and curability. Moreover, the linear organopolysiloxane may indude a small amount of branched structure (trifunctional siloxane units) in the molecular chain.

[Chemical Formula 2]

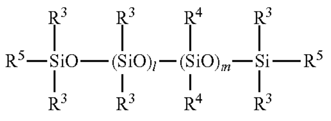

In the formula, $R^3$ represents substituted or unsubstituted monovalent hydrocarbon groups that are the same as or different from each other, and at least one of them is an alkenyl group. $R^4$ represents substituted or unsubstituted monovalent hydrocarbon groups that are the same as or different from each other and have no aliphatic unsaturated bond, $R^5$ represents alkenyl groups, and l and m represent 0 or positive integers. The monovalent hydrocarbon group represented by $R^3$ preferably has 1 to 10 carbon atoms, and more preferably 1 to 6 carbon atoms. Specific examples of the monovalent hydrocarbon group indude the following: alkyl groups such as methyl, ethyl, propyl, isopropyl, butyl, isobutyl, tert-butyl, pentyl, neopentyl, hexyl, cydohexyl, octyl, nonyl, and decyl groups; aryl groups such as phenyl, tolyl, xylyl, and naphthyl groups; aralkyl groups such as benzyl, phenylethyl, and phenylpropyl groups; alkenyl groups such as vinyl, allyl, propenyl, isopropenyl, butenyl, hexenyl, cydohexenyl, and octenyl groups; and substituted forms of these groups in which some or all hydrogen atoms are substituted by halogen atoms (fluorine, bromine, chlorine, etc.) or cyano groups, including halogen-substituted alkyl groups such as chloromethyl, diloropropyl, bromoethyl, and trifluoropropyl groups and cyanoethyl groups.

The monovalent hydrocarbon group represented by $R^4$ also preferably has 1 to 10 carbon atoms, and more preferably 1 to 6 carbon atoms. Specific examples of the monovalent hydrocarbon group may be the same as those of $R^1$, but do not indude an alkenyl group. The alkenyl group represented by $R^5$ has, e.g., 2 to 6 carbon atoms, and more preferably 2 to 3 carbon atoms. Specific Examples of the alkenyl group may be the same as those of $R^2$ in the formula (Chemical Formula 1), and the vinyl group is preferred. In the formula (Chemical Formula 2), l and m are typically 0 or positive integers satisfying $0<l+m\leq 10000$, preferably $5\leq l+m\leq 2000$, and more preferably $10\leq l+m\leq 1200$. Moreover, l and m are integers satisfying $0<l/(l+m)\leq 0.2$, and preferably $0.0011\leq l/(l+m)\leq 0.1$.

(2) Crosslinking Component (Component A2)

The component A2 is an organohydrogenpolysiloxane that acts as a crosslinking agent. The addition reaction (hydrosilylation) between SiH groups in the component A2 and alkenyl groups in the component A1 produces a cured product. Any organohydrogenpolysiloxane that has two or more silicon-bonded hydrogen atoms (i.e., SiH groups) per molecule may be used. The molecular structure of the organohydrogenpolysiloxane may be a linear, ring, branched, or three-dimensional network structure. The number of silicon atoms in a molecule (i.e., the degree of polymerization) may be 2 to 1000, and particularly about 2 to 300.

The locations of the silicon atoms to which the hydrogen atoms are bonded are not particularly limited. The silicon atoms may be either at the ends or not at the ends (but in the middle) of the molecular chain. The organic groups bonded to the silicon atoms other than the hydrogen atoms may be, e.g., substituted or unsubstituted monovalent hydrocarbon groups that have no aliphatic unsaturated bond, which are the same as those of $R^1$ in the general formula (chemical formula 1).

The organohydrogenpolysiloxane of the component A2 may have the following structure.

[Chemical Formula 3]

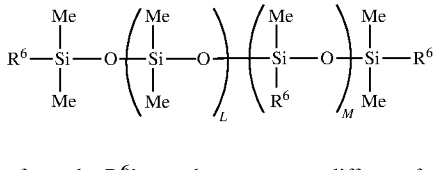

In the formula, $R^6$'s are the same as or different from each other and represent alkyl groups, phenyl groups, epoxy groups, acryloyl groups, methacryloyl groups, alkoxy groups, or hydrogen atoms, and at least two of $R^6$'s are hydrogen atoms. L represents an integer of 0 to 1000, and particularly 0 to 300, and M represents an integer of 1 to 200.

(3) Catalyst Component (Component C)

The catalyst component of the component C may be a catalyst used for a hydrasilyktion reaction. Examples of the catalyst indude platinum group metal catalysts such as platinum-based, palladium-based, and rhodium-based catalysts. The platinum-based catalysts indude, e.g., platinum black, platinum chloride, chloroplatinic acid, a reaction product of chloroplatinic acid and monohydric alcohol, a complex of chloroplatinic acid and olefin or vinylsiloxane, and platinum bisacetoacetate.

(4) Thermally Conductive Inorganic Filler (Component B) and Heat Resistance Improver (Component D)

The thermally conductive inorganic filler and the heat resistance improver are as described above.

(5) Other Additives

The composition of the present invention may indude components other than the above as needed. For example, a flame retardant auxiliary and a curing retarder may be added. Moreover, an organic or inorganic pigment may be added for the purpose of coloring and toning.

Examples

Hereinafter, the present invention will be described by way of examples. However, the present invention is not limited to the following examples. Various physical properties were measured in the following manner.

<BET Specific Surface Area>

The BET specific surface area of a thermally conductive filler was the value of the manufacturer's catalog. The specific surface area means the surface area per unit mass or the surface area per unit volume of a substance. The specific surface area analysis is based on the adsorption of molecules on the surface of powder partides at a liquid nitrogen temperature. Since the area occupied by an adsorbed molecule has been known, the specific surface area of a sample is determined from the amount of the adsorbed molecules by using the BET equation <Average Particle Size>

The average particle size was $D_{50}$ (median diameter) in a volume-based cumulative particle size distribution measured by a laser diffraction scattering method. The method may use, e.g., a laser diffraction/scattering particle size distribution analyzer LA-950 S2 manufactured by HORIBA, Ltd.

<Thermal Conductivity of Thermally Conductive Silicone Sheet>

Figure 1B:
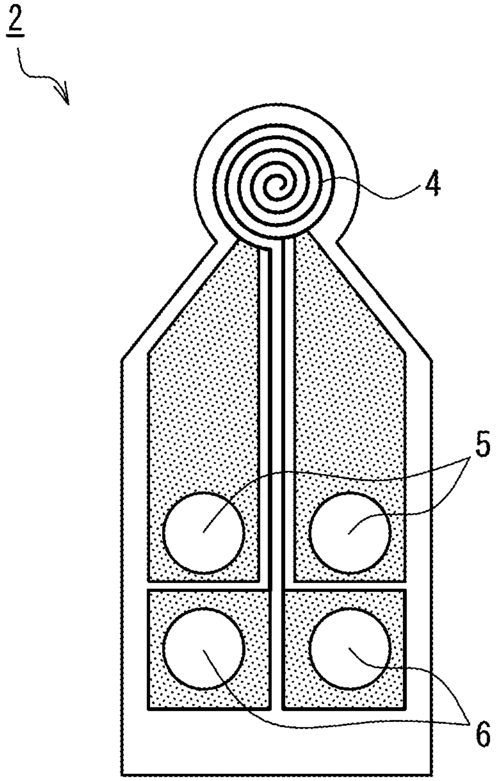

The thermal conductivity of a thermally conductive silicone sheet was measured by a hot disk (in accordance with ISO/CD 22007-2). As shown in FIG. 1A, using a thermal conductivity measuring apparatus 1, a polyimide film sensor 2 was sandwiched between two samples 3*a*, 3*b*, and constant power was applied to the sensor 2 to generate a certain amount of heat. Then, the thermal characteristics were analyzed from the value of a temperature rise of the sensor 2. The sensor 2 has a tip 4 with a diameter of 7 mm. As shown in FIG. 1B, the tip 4 has a double spiral structure of electrodes. Moreover, an electrode 5 for an applied current and an electrode 6 for a resistance value (temperature measurement electrode) are located on the lower portion of the sensor 2. The thermal conductivity was calculated by the following formula (1).

$$\lambda = \frac{P_0 \cdot D(\tau)}{\pi^{3/2} \cdot r} \cdot \frac{D(\tau)}{\Delta T(\tau)} \quad \text{[Formula 1]}$$

λ: Thermal conductivity (W/m·K)

$P_0$: Constant power (W)

r: Radius of sensor (m)

τ: $\sqrt{\alpha \cdot t/r^2}$

α: Thermal diffusivity of sample ($m^2/s$)

t: Measuring time (s)

D(τ): Dimensionless function of τ

ΔT(τ): Temperature rise of sensor (K)

<Hardness>

The hardness of the silicone sheet produced was measured in accordance with the Asker C hardness based on the Society of Rubber Industry, Japan Standard (SRIS 0101).

<Heat Resistance>

The silicone sheet produced was placed in a circulating hot air oven at 220° C., taken out after a predetermined time elapsed, and cooled to mom temperature. Then, the hardness of the silicone sheet was measured in accordance with the Asker C hardness based on the Society of Rubber Industry, Japan Standard (SRIS 0101).

<Materials>

Examples and Comparative Examples used the following materials.

A. Matrix Resin (Base Polymer)

The matrix resin was an organopolysiloxane, which is a commercially available addition reaction type silicone gel material (composed of an agent A and an agent B; one of them containing a crosslinking agent and the other containing a platinum-based catalyst).

B. Thermally Conductive Inorganic Filler

B-1: Irregularly-shaped particles of aluminum oxide (alumina) with a BET specific surface area of 5.2 $m^2/g$ and an average particle size (D50) of 2.3 μm were used, and 1.0 g of methyltrimethoxysilane was added and mixed with 100 g of the alumina. The mixture was heat-treated at 130° C. for 120 minutes so that the methyltrimethoxysilane was fixed to the surface of the alumina particles (the pretreatment method).

B-2: Irregularly-shaped particles of aluminum oxide (alumina) with a BET specific surface area of 5.2 $m^2/g$ and an average particle size (D50) of 2.3 μm were used, and 1.1 g of ethyltrimethoxysilane was added and mixed with 100 g of the alumina. The mixture was heat-treated at 130° C. for 120 minutes so that the ethyltrimethoxysilane was fixed to the surface of the alumina particles (the pretreatment method).

B-3: Irregularly-shaped particles of aluminum oxide (alumina) with a BET specific surface area of 5.2 $m^2/g$ and an average particle size (D50) of 2.3 μm were used, and 1.5 g of n-propyltriethoxysilane was added and mixed with 100 g of the alumina. The mixture was heat-treated at 130° C. for 120 minutes so that the n-propyltriethoxysilane was fixed to the surface of the alumina particles (the pretreatment method).

B-4: Irregularly-shaped particles of aluminum oxide (alumina) with a BET specific surface area of 5.2 $m^2/g$ and an average particle size (D50) of 2.3 μm were used, and 2.0 g of decyltrimethoxysilane was added and mixed with 100 g of the alumina. The mixture was heat-treated at 130° C. for 120 minutes so that the decyltrimethoxysilane was fixed to the surface of the alumina particles (the pretreatment method).

B-5: Irregularly-shaped particles of aluminum oxide (alumina) with a BET specific surface area of 5.2 $m^2/g$ and an average particle size (D50) of 2.3 μm were used without a surface treatment.

B-6: Spherical melted and solidified particles of aluminum oxide (alumina) with a BET specific surface area of 0.2 $m^2/g$ and an average particle size (D50) of 35 μm were used without a surface treatment.

B-7: Spherical melted and solidified particles of aluminum oxide (alumina) with a BET specific surface area of 1.3 $m^2/g$ and an average particle size (D50) of 3 μm were used, and 0.35 g of tetraethoxysilane was added and mixed with 100 g of the alumina. The mixture was heat-treated at 130° C. for 120 minutes so that the tetraethoxysilane was fixed to the surface of the alumina particles (the pretreatment method).

B-8: Spherical melted and solidified particles of aluminum oxide (alumina) with a BET specific surface area of 1.3 $m^2/g$ and an average particle size (D50) of 3 μm were used without a surface treatment.

B-9: Irregularly-shaped particles of aluminum oxide (alumina) with a BET specific surface area of 5.2 $m^2/g$ and an average particle size (D50) of 2.3 μm were used, and 1.3 g of iso-butyltrimethoxysilane was added and mixed with 100 g of the alumina. The mixture was heat-treated at 130° C. for 120 minutes so that the iso-butyltrimethoxysilane was fixed to the surface of the alumina particles (the pretreatment method).

B-10: Irregularly-shaped particles of aluminum oxide (alumina) with a BET specific surface area of 5.2 $m^2/g$ and an average particle size (D50) of 2.3 μm were used, and 1.5 g of phenyltrimethoxysilane was added and mixed with 100 g of the alumina. The mixture was heat-treated at 130° C. for 120 minutes so that the phenyltrimethoxysilane was fixed to the surface of the alumina particles (the pretreatment method).

B-11: Spherical melted and solidified parades of aluminum oxide (alumina) with a BET specific surface area of 1.3 $m^2/g$ and an average particle size (D50) of 3 μm were used, and 0.3 g of methyltriethoxysilane was added and mixed with 100 g of the alumina. The mixture was heat-treated at 130° C. for 120 minutes so that the methyltriethoxysilane was fixed to the surface of the alumina partides (the pretatment method).

B-12: Spherical melted and solidified particles of aluminum oxide (alumina) with a BET specific surface area of 1.3 $m^2/g$ and an average particle size (D50) of 3 μm were used, and 0.3 g of n-butyltrimethoxysilane was added and mixed with 100 g of the alumina. The mixture was heat-treated at 130° C. for 120 minutes so that the n-butyltrimethoxysilane was fixed to the surface of the alumina particles (the pretreatment method).

B-13: Spherical melted and solidified particles of aluminum oxide (alumina) with a BET specific surface area of 1.3 $m^2/g$ and an average particle size (D50) of 3 μm were used, and 0.35 g of phenyltrimethoxysilane was added and mixed with 100 g of the alumina. The mixture was heat-treated at 130° C. for 120 minutes so that the phenyltrimethoxysilane was fixed to the surface of the alumina particles (the pretreatment method).

C Heat resistance improver

C-1: α-iron (III) oxide

C-2: copper phthalocyanine

C-3: fumed titanium oxide

C-4: benzimidazolone

Examples 1 to 3, 5, 6, 11 to 13 and Comparative Examples 1 to 2

The matrix resin, the thermally conductive filler (i.e., the surface-treated filler), and the heat resistance improver were mixed according to the composition shown in Table 1 by using a rotation-revolution mixer (MAZERUSTAR KK-400W manufactured by KURABO INDUSTRIES LTD.) to provide a mixture. The resulting mixture was sandwiched between polyethylene terephthalate (PET) films, which had been subjected to a release treatment, and molded into a sheet with a thickness of 2.0 mm by a roll press. Then, the sheet was heated at 100° C. for 30 minutes and cured to form a silicone gel sheet. The Asker C hardness and the thermal conductivity of the thermally conductive silicone gel sheet thus obtained were measured. The thermal conductivity was measured by a hot disk (manufactured by Kyoto Electronics Mani ifacturing Co., Ltd.). Table 1 shows the conditions and results. In Table 1, the mass is expressed as the amount (g) with respect to 100 g of the matrix resin.

TABLE 1

| | | Ex. 1 | Ex. 2 | Ex. 3 | Comp. Ex. 1 | Comp. Ex. 2 | Ex. 5 | Ex. 6 | Ex. 11 | Ex. 12 | Ex. 13 |
|---|---|---|---|---|---|---|---|---|---|---|---|
| Matrix resin (A solution + B solution) (g) | | 100 | 100 | 100 | 100 | 100 | 100 | 100 | 100 | 100 | 100 |
| Thermally conductive filler mass (g) | | B-1 500 | B-2 500 | B-3 500 | B-4 500 | B-5 500 | B-9 500 | B-10 500 | B-3 500 | B-3 500 | B-3 500 |
| Heat resistance improver mass (g) | | C-1 1.5 | C-1 1.5 | C-1 1.5 | C-1 1.5 | C-1 1.5 | C-1 1.5 | C-1 1.5 | C-2 0.5 | C-3 1.0 | C-4 1.5 |
| Thermal conductivity (W/m · K) | | 1.3 | 1.3 | 1.2 | 1.2 | insufficient curing | 1.3 | 1.3 | 1.27 | 1.23 | 1.19 |
| Initial hardness, Asker C | | 25 | 27 | 30 | 8 | not measurable | 28 | 33 | 29 | 25 | 25 |
| Heat resistance 220° C. aging test | 100 hours, Asker C | 23 | 25 | 28 | 60 | — | 23 | 30 | 22 | 20 | 22 |
| | 500 hours, Asker C | 24 | 27 | 29 | 72 | — | 40 | 31 | 24 | 29 | 27 |
| | 1000 hours, Asker C | 25 | 35 | 33 | 80 | — | 40 | 30 | 33 | 32 | 32 |
| | Change in hardness after 100 hours | −2 | −2 | −2 | +52 | — | −5 | −3 | −7 | −5 | −3 |
| | Change in hardness after 500 hours | −1 | 0 | −1 | +64 | — | +12 | −2 | −5 | 4 | 2 |

The results confirmed that the silicone heat dissipating sheets of Examples 1 to 3, 5, 6, and 11 to 13 had high heat resistance. Moreover, the results of the heat resistance test showed that the silicone heat dissipating sheets were temporarily softened by high-temperature aging for a short period of time (100 hours) and then were cured again by high-temperature aging for a middle period of time (500 hours). The silicone heat dissipating sheets undergoing this phenomenon were resistant to thermal degradation due to long-term high-temperature aging.

On the other hand, the silicone sheet of Comparative Example 1 had low heat resistance because the surface treatment agent was decyltrimethoxysilane. The silicone sheet of Comparative Example 2 caused insufficient curing because the surface treatment agent was not used.

Examples 4 and 7 to 10

Examples 4 and 7 to 10 were performed in the same manner as Example 1 except that 67% by mass of large particles that were not surface treated and 33% by mass of small particles that were surface treated were used in combination as a thermally conductive inorganic filler.

Comparative Example 3

Comparative Example 3 was performed in the same manner as Example 4 except that 67% by mass of large particles that were not surface treated and small particles that were not surface treated were used in combination as a thermally conductive inorganic filler.

Table 2 shows the conditions and results.

TABLE 2

| | | Ex. 4 | Comp. Ex. 3 | Ex. 7 | Ex. 8 | Ex. 9 | Ex. 10 |
|---|---|---|---|---|---|---|---|
| Matrix resin (A solution + B solution) | | 100 | 100 | 100 | 100 | 100 | 100 |
| Thermally conductive filler without surface treatment | | B-6 800 | B-6 800 | B-6 800 | B-6 800 | B-6 800 | B-6 800 |
| Thermally conductive filler with surface treatment | | B-7 400 | B-8 400 | B-7 400 | B-11 400 | B-12 400 | B-13 400 |
| Heat resistance improver | | C-2 0.5 | C-2 0.5 | C-1 1.5 | C-1 1.5 | C-1 1.5 | C-1 1.5 |
| Thermal conductivity (W/m · K) | | 3.3 | insufficient curing | 3.5 | 3.5 | 3.5 | 3.1 |
| Initial hardness, Asker C | | 55 | — | 58 | 58 | 56 | 49 |
| Heat resistance 220° C. aging test | 100 hours, Asker C | 46 | — | 56 | 57 | 56 | 49 |
| | 500 hours, Asker C | 45 | — | 57 | 58 | 60 | 55 |
| | 1000 hours, Asker C | 56 | — | 61 | 58 | 63 | 59 |
| | Change in hardness after 100 hours | −9 | — | −2 | −1 | 0 | 0 |
| | Change in hardness after 500 hours | −10 | — | −1 | 0 | 4 | 6 |

As shown in Table 2, the results confirmed that the silicone heat dissipating sheets had high heat resistance even though they used the combination of the large particles that were not surface treated and the small particles that were surface treated. Moreover, the results of the heat resistance test showed that the silicone heat dissipating sheets were temporarily softened or maintained the initial hardness by high-temperature aging for a short period of time (100 hours) and then were cured again by high-temperature aging for a middle period of time (500 hours). The silicone heat dissipating sheets undergoing this phenomenon were resistant to thermal degradation due to long-term high-temperature aging.

On the other hand, the silicone sheet of Comparative Example 3 caused insufficient curing because the surface treatment agent was not used.

Industrial Applicability

The thermally conductive silicone composition of the present invention is suitable as a thermal interface material (TIM) to be interposed between a heat generating member and a heat dissipating member of electrical and electronic components or the like.

DESCRIPTION OF REFERENCE NUMERALS

1 Thermal conductivity measuring apparatus
2 Sensor
3*a*, 3*b* Sample
4 Tip of the sensor
5 Electrode for applied current
6 Electrode for resistance value (temperature measurement electrode)

The invention claimed is:

1. A thermally conductive silicone heat dissipating material comprising:

a silicone polymer as a matrix resin;

a first thermally conductive inorganic filler; and a heat resistance improver, wherein the first thermally conductive inorganic filler has a BET specific surface area of 0.3 $m^2/g$ or more and is surface treated with a surface treatment agent expressed by $Si(OR')_4$ or $R_xSi(OR')_{4-x}$ where R represents a hydrocarbon group having 1 to 4 carbon atoms or an aromatic hydrocarbon group having 6 to 12 carbon atoms, R' represents a hydrocarbon group having 1 to 4 carbon atoms, and x represents an integer of 1 to 2, the thermally conductive silicone heat dissipating material further comprises a second thermally conductive inorganic filler with a BET specific surface area of less than 0.3 $m^2/g$, and the second thermally conductive inorganic filler is not surface treated, a content of the first thermally conductive inorganic filler is 100 to 10000 parts by mass with respect to 100 parts by mass of the silicone polymer as the matrix resin, the heat resistance improver is at least one selected from the group consisting of α-iron (III) oxide, copper phthalocyanine, cerium octylate, and a benzimidazolone compound, a content of the heat resistance improver is 0.01 to 10 parts by mass with respect to 100 parts by mass of the matrix resin, and an Asker C hardness of the thermally conductive silicone heat dissipating material after aging at 220° C. for 100 hours in air is minus 15 to 0 compared to an initial hardness, and the Asker C hardness of the thermally conductive silicone heat dissipating material after the aging has further continued at 220° C. for 500 hours in the air is minus 20 to plus 20 compared to the initial hardness.

2. The thermally conductive silicone heat dissipating material according to claim 1, wherein the surface treatment agent is applied in an amount of 0.05 to 5 parts by mass with respect to 100 parts by mass of the first thermally conductive inorganic filler.

3. The thermally conductive silicone heat dissipating material according to claim 1, wherein the first thermally conductive inorganic filler is composed of at least one selected from the group consisting of aluminum oxide, zinc oxide, aluminum nitride, boron nitride, magnesium oxide, aluminum hydroxide, and silica other than hydrophilic fumed silica.

4. The thermally conductive silicone heat dissipating material according to claim 1, wherein a content of the first thermally conductive inorganic filler is 10% by mass or more and 100% by mass or less with respect to 100% by mass of a total amount of the first and second thermally conductive inorganic fillers.

5. The thermally conductive silicone heat dissipating material according to claim 1, wherein the thermally conductive silicone heat dissipating material is in a form of at least one selected from the group consisting of grease, putty, gel, and rubber.

6. The thermally conductive silicone heat dissipating material according to claim 1, wherein the thermally conductive silicone heat dissipating material is in the form of a sheet.

7. The thermally conductive silicone heat dissipating material according to claim 1, having a feature that the thermally conductive silicone heat dissipating material is temporarily softened or maintains an initial hardness after aging at 220° C. for 100 hours in air and then is cured again after aging at the same temperature for 500 hours in the air.

* * * * *